Patented Jan. 11, 1938

2,104,754

UNITED STATES PATENT OFFICE 2,104,754

PROCESSES FOR THE MANUFACTURE OF COMPLEX METALLIC SALT

Daniel W. Marsh and Benjamin H. Marsh, Oakland, Calif.

No Drawing. Application November 30, 1935,
Serial No. 52,354

14 Claims. (Cl. 23—55)

The invention relates to a process for the manufacture of complex metallic salt containing a relatively high content of copper suitable for use in preparing copper solutions for the plating and artificial silk industries, and as a combined insecticide and fungicide.

It is the primary object of this invention to provide a process whereby products of the class particularly suitable for the various arts, may be readily produced, free of uncombined reactants. A further object is to provide a process whereby these products may be manufactured more economically, in less time and with better yield than is the case in the processes hitherto proposed.

It has been found that complex metallic salts containing a relatively high amount of copper hydroxide $Cu(OH)_2$ may be readily produced directly from metallic copper by immersing the metal in an aqueous solution in which there is suspended a complex compound of a metal and ammonia, and introducing an oxidizing agent such as air or other suitable oxygen containing gases. To this end we employ a water soluble salt of a metal of the class consisting of the sulphate, chloride or nitrate of copper, zinc, alumina, lead, nickel, mercury, platinum and analogous metals, to which we add aqueous or gaseous ammonia in quantity sufficient to form an aqueous suspension of the metal and absorbed ammonia gas. It is therefore seen, the mixture is a watery solution in which there is suspended a metallic salt containing absorbed ammonia gas and that there is substantially no free ammonia present in the mixture. Any water soluble metallic salt which will absorb ammonia gas, with the exception of metallic salts which act as reducing agents such as ferrous salts, is adapted to the process. We have found that by immersing metallic copper in the mixture and introducing oxygen containing gases, the suspended complex compound of metal and ammonia, dissociates, liberating the absorbed ammonia which combines with the water present and attacks the copper, with formation of copper hydroxide $Cu(OH)_2$ in combination with a relatively small quantity of basic salts from the dissociated complex compound. It is therefore seen the water soluble metallic salt employed in the initial suspension, serves to carry the absorbed ammonia gas and that the oxygen containing gases cause the metallic salt to dissociate in the presence of the metal which takes up the ammonia as it becomes active and that the reaction continues as long as the active ammonia, metallic copper and oxygen containing gases are present.

The invention therefore consists broadly in immersing metallic copper in an aqueous solution in which there is suspended metallic salt containing absorbed ammonia gas and introducing oxygen containing gases so as to liberate the absorbed ammonia, resulting in the conversion of the metallic copper to copper hydroxide $Cu(OH)_2$ with subsequent formation of the complex metallic salt.

It has further been found that metallic copper can be more vigorously and quickly attacked and converted, and a more finely divided product obtained, if a substance capable of acting as a catalyst or accelerator is present during the reaction. We have found that particularly good results may be had by employing a relatively small quantity of a halogen substance, for example, a solution of iodine, with which we have had excellent results. The catalyst may be used over and over again in the same mother liquor, it being necessary only to replace the slight loss of a mechanical nature.

A particular form of the invention thus consists in immersing metallic copper in an aqueous solution in which there is suspended metallic salt containing absorbed ammonia gas, adding thereto, a relatively small quantity of iodine solution or other suitable halogen substance capable of acting as a positive catalyst, and introducing oxygen containing gases.

It has further been found that complex metallic salts especially suitable for use as agricultural insecticides and fungicides may be produced by combining other metals or salts having properties of known value for combating insect pests, parasitic fungi and the like. This may be effected by adding a water soluble salt of the desired metal to the reaction mixture from time to time as the process is in operation. The water soluble salts are precipitated by the liberated ammonia, coating, impregnating and otherwise becoming thoroughly incorporated with the product of the original reaction mixture. The water soluble metallic salts found available for this purpose, consist of the sulphate, chloride and nitrate of mercury, zinc, copper and analogous metals having properties of known value as agricultural insecticides and fungicides.

The invention thus comprises also a process wherein there is added, from time to time, to the reaction mixture in which there is a suspension of metallic salt containing absorbed ammonia gas, a solution of soluble metallic salt selected from the group of the sulphate, chloride or nitrate of mercury, zinc, copper and analogous metals having properties of known value for combating insect pests, parasitic fungi and the like.

The following is a description of a preferred procedure in accordance with our invention which will serve to illustrate it.

An intial complex compound composed of an aqueous suspension of metallic salt containing absorbed ammonia gas is prepared by reacting aqueous ammonia $NH_3$ with a solution of copper sulphate $CuSO_4$, of any convenient concentration, for example, 20 Baumé, in such amount that the solution of copper sulphate is just saturated and the mixture tests neutral to litmus. A water soluble salt of mercury, zinc or other suitable metal may be employed in lieu of copper sulphate. Gaseous ammonia may be employed in place of the aqueous ammonia in which case it is preferable to have the concentration of copper sulphate about 15 Baumé. It is preferable to slowly stir or agitate the preparation in any suitable manner, and to have the reacting solutions at a temperature in the neighborhood of 15 degree centigrade. Higher temperatures, particularly above 35 degree centigrade, tends to form coarse particles which are unsatisfactory for some purposes. A few drops of iodine, per gallon of reaction liquor employed, is now added and metallic copper in the form of wire, thin strips, foil etc., is immersed and a current of finely divided air is continuously passed through the solution whereupon the metallic salt containing absorbed ammonia gas, dissociates liberating ammonia which joins the water in attacking the copper, resulting in a continual precipitation of copper hydroxide, $Cu(OH)_2$ in combination with basic salts of the dissociated initial complex compound. The introduction of air is continued until the absorbed ammonia has become exhausted and ceases to act on the copper and the supernatant liquid is water white. The product is then withdrawn from the reaction vessel, filtered from the liquid, and prepared for the market in any suitable manner. The filtrate or mother liquor containing the iodine is returned to the reaction vessel for a second batch of material and a small quantity of iodine is added to balance the mechanical losses. It will be found that approximately 85% to 90% of the product is composed of copper hydroxide, the balance being sulphates of ammonia and copper. Where it is desirable to include in the final product, a greater amount of such metals as mercury, zinc or other suitable compounds, than can be accomplished by their being employed in the intial complex compound, this may be effected by adding the water soluble salts of the metals to the reaction mixture as the process is in operation. The amount of copper hydroxide contained in the final product is proportionately reduced by the added compounds.

While the process is preferably conducted with scrap copper in the form of wire, thin strips, sheets, foil etc., it is also adapted to the use of copper bearing materials, alloys of copper etc.

While we have described certain reactions as those which presumably take place, we do not wish to be understood as limiting ourselves to such reactions, it being our intention to claim as our invention, the method whereby the results described herein are accomplished, as well as the product of the method. Numerous variations and modifications of detail may obviously be made without departing from the scope and spirit of the invention.

This case is a continuation in part of our application Serial No. 732,474, filed June 26, 1934, and now abandoned.

Having thus particularly described and ascertained the nature of our said invention and in what manner the same is to be performed, what we claim and desire to secure by Letters Patent is:

1. The process of making complex metallic salt which comprises reacting soluble cupric salts of the class consisting of the sulphate, chloride and nitrate with ammonia in aqueous solution added to alkalinity to form a suspension of insoluble copper salt in chemical combination with ammonia, and reacting said suspension with metallic copper and oxygen-containing gases.

2. The process of making complex metallic salt which comprises reacting soluble cupric salts of the class consisting of the sulphate, chloride and nitrate with ammonia in aqueous solution added to alkalinity to form a suspension of insoluble copper salt in chemical combination with ammonia, adding a solution of iodine thereto, and reacting said suspension with metallic copper and oxygen-containing gases.

3. The process of making complex metallic salt which comprises reacting soluble zinc salts of the class consisting of the sulphate, chloride and nitrate with ammonia in aqueous solution added to alkalinity to form a suspension of insoluble zinc salt in chemical combination with ammonia, and reacting said suspension with metallic copper and oxygen-containing gases.

4. The process of making complex metallic salt which comprises reacting soluble zinc salts of the class consisting of the sulphate, chloride and nitrate with ammonia in aqueous solution added to alkalinity to form a suspension of insoluble zinc salt in chemical combination with ammonia, adding a solution of iodine thereto, and reacting said suspension with metallic copper and oxygen-containing gases.

5. The process of making complex metallic salt which comprises reacting soluble aluminum salts of the class consisting of the sulphate, chloride and nitrate with ammonia in aqueous solution added to alkalinity to form a suspension of insoluble aluminum salt in chemical combination with ammonia, and reacting said suspension with metallic copper and oxygen-containing gases.

6. The process of making complex metallic salt which comprises reacting soluble aluminum salts of the class consisting of the sulphate, chloride and nitrate with ammonia in aqueous solution added to alkalinity to form a suspension of insoluble aluminum salt in chemical combination with ammonia, adding a solution of iodine thereto, and reacting said suspension with metallic copper and oxygen-containing gases.

7. The process as described in claim 1 wherein there is added to the reaction mixture from time to time as the process is in operation, a solution of a water-soluble cupric salt of the class consisting of the sulphate, chloride and nitrate.

8. The process as described in claim 2 wherein there is added to the reaction mixture from time to time as the process is in operation, a solution of a water-soluble cupric salt of the class consisting of the sulphate, chloride and nitrate.

9. The process as described in claim 4 wherein there is added to the reaction mixture from time to time as the process is in operation, a solution of a water-soluble cupric salt of the class consisting of the sulphate, chloride and nitrate.

10. The process as described in claim 2 wherein there is added to the reaction mixture from time to time as the process is in operation, a solution of a water-soluble zinc salt of the class consisting of the sulphate, chloride and nitrate.

11. The process as described in claim 4 wherein there is added to the reaction mixture from time to time as the process is in operation, a solution of a water-soluble zinc salt of the class consisting of the sulphate, chloride and nitrate.

12. The process as described in claim 6 wherein there is added to the reaction mixture from time to time as the process is in operation, a solution of a water-soluble zinc salt of the class consisting of the sulphate, chloride and nitrate.

13. The process of making complex metallic salt which comprises reacting a soluble salt of the class consisting of the sulphates, chlorides and nitrates of zinc, aluminum, cupric copper, lead, mercury, nickel and platinum with ammonia in aqueous solution added to alkalinity to form a suspension of an insoluble metal salt in chemical combination with ammonia, and reacting said suspension with metallic copper and oxygen-containing gases.

14. As new products, compounds containing about 85% of copper as cupric hydroxide and the balance a water-insoluble complex salt of copper with a metal selected from the class consisting of zinc, aluminum, lead, mercury, nickel, and platinum and prepared by reacting a soluble salt of the class consisting of the sulphates, chlorides and nitrates of zinc, aluminum, cupric copper, lead, mercury, nickel and platinum with ammonia in aqueous solution added to alkalinity to form a suspension of an insoluble metal salt in chemical combination with ammonia, and reacting said suspension with metallic copper and oxygen-containing gases.

DANIEL W. MARSH.
BENJAMIN H. MARSH.